Patented Sept. 19, 1939

2,173,448

UNITED STATES PATENT OFFICE 2,173,448

PREPARATION OF ALKYLOLAMINE DERIVATIVES

Morris B. Katzman and Albert K. Epstein, Chicago, Ill.; said Katzman assignor to The Emulsol Corporation, Chicago, Ill., a corporation of Illinois No Drawing. Application May 17, 1937, Serial No. 143,135

20 Claims. (Cl. 260—404)

This invention relates to improvements in the preparation of chemical compounds in the form of reaction products and is particularly concerned with the production of products having excellent color and freedom from objectionable odors.

It has already been proposed to prepare condensation products of alkylolamines and higher carboxylic acids, particularly higher carboxylic acid esters, especially higher fatty acid esters, of alkylolamines by reaction of alkylolamines with said acids or with derivatives of said acids such as esters and anhydrides thereof. In general, the temperatures employed in carrying out said reaction are substantially in excess of 100 degrees C., in general being of the order of 200 degrees C. or somewhat more or less. The compounds resulting from such reactions have a dark color and a somewhat disagreeable odor thereby lessening the value thereof in various arts and industries, particularly for use in cosmetic preparations.

It has been found that the disadvantages of the prior art may be overcome and novel reaction products may be produced having excellent color and substantial freedom from objectionable odors.

In general, the products with the improved characteristics to which the present invention relates are prepared by carrying out the reaction, which may be between an alkylolamine and a higher carboxylic acid, an ester or an anhydride thereof, in the presence of steam, preferably, but not necessarily, under reduced pressure, followed by quick cooling after the completion of the reaction. In practice, it has been found that the utilization of steam during the reaction, which may be carried out at a temperature of 250 degrees C. or higher or lower and at atmospheric pressure or at a reduced pressure of about 10 mm. to 70 mm. of mercury during the reaction, produces excellent results, the steam being passed into the reaction mixture below the level thereof in the reaction vessel. It will be appreciated, of course, that the reaction temperature and the reduced pressure, if employed, may be varied within limits which will be understood by those skilled in the art without departing from the spirit of the present invention. Indeed, for example, as indicated, it is not essential that reduced pressure be employed although the utilization of this feature generally results in the production of somewhat superior products. The quick cooling of the reaction mixture subsequent to the completion of the reaction is effected in the presence of steam and may be very satisfactorily carried out by continuing the passage of steam through the reaction mass after the completion of the reaction and simultaneously cooling the reaction vessel by contact with ice or by the use of cooling coils. When the reaction mass cools down to a sufficient extent, generally of the order of about 125 degrees C., the steam may be shut off and the cooling continued. Just exactly what the mechanism of the reaction is that produces the unusual results of the present invention is not fully understood and, therefore, it is preferred not to theorize relative thereto. That the problem is not necessarily one of oxidation, however, appears clear since the carrying out of the reaction in the presence of an inert gas, such as carbon dioxide, hydrogen or nitrogen, does not produce the results described hereinabove.

One of the objects of the invention is, accordingly, the preparation of novel chemical compounds of the type indicated possessing excellent color and being substantially odorless and having utility as detergent, emulsifying, and flotation agents, as assistants in the textile and related industries, and, in general, possessing interface modifying properties making said compounds useful in the arts where such functions are desired.

Another object resides in the preparation of said novel compositions of matter or reaction products to enhance their utility for the emulsification of oleaginous and aqueous materials, particularly for use in white cosmetic emulsions such as face creams, cold creams, vanishing creams, tissue creams and the like.

Another object is the provision of novel reaction products, having a light color and being substantially odorless, which are useful as intermediates in the preparation of interface modifying and emulsifying agents having particular utility in cosmetic emulsions.

A still further and important object of the invention is concerned with novel methods of preparing said novel reaction products.

Other objects and features of the invention will become more apparent as the description proceeds.

It has been stated hereinabove that the reaction takes place between an alkylolamine and a higher carboxylic acid, an ester or an anhydride of said acid.

Among the higher carboxylic acids which may be employed in the reaction as such or in admixtures of any two or more or in the form of their anhydrides are the following: caproic, capric, caprylic, hydroaromatic acids such as abietic acid, aromatic acids such as benzoic, benzoylbenzoic, naphtholc, toluic, and naphthenic acids, hydroxystearic acids, montanic acid, higher molecular weight saturated and unsaturated fatty acids, particularly those derived from natural fats and oils, such as palmitic acid, stearic, lauric, myristic, melissic, oleic, ricinoleic, linoleic, or mixed higher fatty acids derived from animal or vegetable fats and fish oils such as lard, oleo oil, coconut oil, corn oil, cottonseed oil, soya bean oil, partially or completely hydrogenated vegetable oils such as cottonseed oil, corn oil, sesame oil, and fatty acids of various waxes such as beeswax and carnauba wax.

Among the esters of higher carboxylic acids which may be utilized in the reaction, most important are the naturally occurring triglyceride oils and fats and the waxes which are esters of higher carboxylic acids and monohydric alcohols. These may be derived from animal and vegetable sources and include the following: cottonseed oil, coconut oil, corn oil, sesame oil, soya bean oil, lard, oleo oil, stearine, fish oils such as sardine oil, and said oils whether partially or completely hydrogenated, beeswax, carnauba wax, and the like. Others include the esters of lower molecular weight alcohols and higher carboxylic or higher fatty acids, examples of which esters are ethyl stearate, butyl laurate, propyl palmitate, ethyl oleate, and the like. Particularly satisfactory products have been obtained with coconut oil. Instead of reacting a triglyceride with the alkylolamine, there may be utilized partially esterified polyhydroxy substances or partially esterified polyhydric alcohols such as mono- and/or di-glycerides of higher fatty acids as, for example, mono- and/or diglycerides of mixed coconut oil fatty acids or of other higher fatty or carboxylic acids. In general, these partially esterified polyhydroxy substances may be represented by the formula $(RO)_v—X—(OH)_w$ wherein R is a higher acyl radical, X is the carbon-hydrogen residue of the polyhydroxy substance, and $v$ and $w$ are small whole numbers. The polyhydroxy substances, the carbon-hydrogen residues of which are represented by X in the above general formula, include glycerol, glycols, polyglycerols, polyglycols, sugars, sugar alcohols, hydroxycarboxylic acids and the like. In general, when such compounds are employed in the reaction with the alkylolamines, as described above, lower temperatures can be effectively employed. Thus, for example, in reacting monostearin with commercial triethanolamine in the presence of steam as described herein, temperatures of about 150 degrees C. have been found very suitable and, indeed, the reaction appears to proceed well at a temperature even as low as about 135 degrees C. It will be appreciated, however, that the temperature of reaction will vary to some extent since some compounds are inherently more reactive than others. The disclosure herein of temperature ranges is, therefore, to be taken as illustrative or descriptive and in no sense limitative. In the case of the reaction with an alkylolamine of a monoglyceride, diglyceride or the like, the steam appears to enhance the reaction enabling it to be carried out at relatively lower temperatures and prevents side reactions, which latter produce reaction mixtures of undesirable character.

The alkylolamines which are employed for reaction with the higher carboxylic acid, ester or anhydride thereof are varied and include ethanolamines such as monoethanolamine, diethanolamine, triethanolamine, and mixtures thereof such as are present in commercial triethanolamine; propanol amines, butanolamines, pentanolamines, hexanolamines, glycerol amines, and mixtures thereof, as, for example:

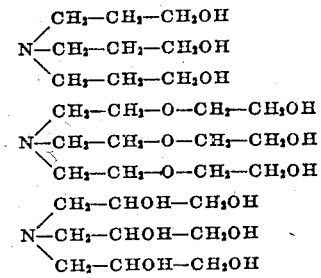

Because of commercial availability at the present time and because of the particularly satisfactory results obtained, it is preferred to utilize commercial tri-ethanolamines which contains minor percentages of mono- and di-ethanolamine. It is, of course, obvious that mixtures of the different alkylolamines also may be employed as well as mixtures of different acids, esters and anhydrides thereof.

In carrying out the reaction, it may be, and preferably is, particularly in the case of reacting alkylolamines with triglycerides, desirable to employ a catalyst and to carry out the reaction, in case triglycerides are used, at elevated temperatures, preferably of the order of 200 degrees C. to 250 degrees C. although it is evident that the exact temperature employed will vary depending upon the specific nature of the reacting materials utilized, the speed of reaction desired, and whether or not a catalyst is employed. Suitable catalysts of this type are alkaline materials such as sodium hydroxide, potassium hydroxide, alkali metal alcoholates and glycerates such as sodium ethylate and sodium glycerate, soaps such as calcium, sodium, potassium and ammonium salts of higher fatty acids, and the like. The catalyst may be dispensed with entirely and excellent results obtained or, if employed, small percentages, of the order of 0.1% to 1.0%, based on the weight of the reacting materials, or even more or less, are very effective.

In order to enable those skilled in the art to even more fully appreciate the nature of the invention, the following examples are given as illustrative of specific embodiments of the invention. It will be understood that they are given by way of example only, in order that those skilled in the art will have a clearer picture of how the invention may be successfully practiced, and are not to be construed as limiting the invention in any way. Thus, for example, the proportions of reacting materials, the temperature and length of time of the reaction, and other conditions may be varied without departing from the scope of the invention as defined in the appended claims.

Example I 300 grams of coconut oil, 300 grams of commercial triethanolamine, and 0.6 gram of potassium hydroxide were placed in a flask, the flask was evacuated to an absolute pressure of 10 to 40 mm. of mercury, heated to 125 degrees C. and then steam at 100 degrees C. was passed directly into the reaction mixture and heat was applied to raise the temperature of the reaction mass to 240 degrees C., the vacuum being maintained. This temperature was maintained for between ten and twenty minutes, steam being continuously passed through the reaction mixture. The color of the final mixture remained substantially the same as it was prior to its undergoing the reaction. The reaction mixture was then cooled very quickly by immersion of the flask in an ice bath and the passage of steam was continued until a temperature of about 125 degrees C. was reached. The steam was then shut off but the quick cooling or refrigeration was continued until a temperature of about 60 degrees C. to 70 degrees C. was reached after which the product was allowed to cool in the atmosphere. The final product was a clear, light straw or amber colored liquid essentially free of odor.

If the same reaction is carried out in a vacuum or in an inert atmosphere or under ordinary atmospheric conditions, without the use of steam as described, a product is obtained having a dark color and objectionable odor. It appears that the color and odor are correlative properties since the darker the color of the product, the more objectionable is its odor.

Example II 50 parts, by weight, of partially hydrogenated cottonseed oil having a melting point of about 100 degrees F. were preheated to a temperature of 240 degrees C. and admixed with 50 parts, by weight, of commercial triethanolamine previously heated in the presence of steam to 240 degrees C., and the reaction was continued at this temperature in the presence of steam for thirty minutes. The reaction mass was then quickly cooled and described hereinabove in Example I. The final reaction product had excellent color and was substantially free from odor.

Example III 2160 grams of a mixture of higher fatty acid monoglycerides and diglycerides,* predominantly the former, were mixed with 1760 grams of commercial triethanolamine and the mixture was heated to 125 degrees C.–135 degrees C. and then steam was passed through the reaction mixture. The temperature of the reaction mass was raised to about 160 degrees C. and maintained for about 40 minutes while continuing to pass steam therethrough. At the end of the 40 minutes, the heating was discontinued and the reaction flask was rapidly cooled to 125 degrees C. by immersion in an ice bath, the passage of the steam being continued. When the temperature of 125 degrees C. was reached, the steam was shut off but the rapid cooling continued until a temperature of 60 degrees to 70 degrees C. was reached after which the cooling was permitted to take place in the atmosphere. A reaction product having a light amber color and substantial freedom from odor resulted.

Example IV 272 grams of a mixture of monoglycerides and diglycerides, prepared as described in Example III, were mixed with 220 grams of commercial triethanolamine and placed in a flask. A vacu-

---

\* Note.—The mixture of monoglycerides and diglycerides was prepared by heating together 600 parts by weight of cottonseed oil hydrogenated to an iodine value of about 69 and 150 parts by weight of normally liquid cottonseed oil with 250 parts by weight of glycerine, the mixture being heated to about 200 degrees F. with stirring. 12 parts by weight of sodium glycerate were then added and the temperature raised to 485 degrees F. and held at that temperature for two hours with stirring. A non-oxidizing atmosphere, of $CO_2$, was maintained during the heating and the subsequent cooling to 200 degrees F. Glycerine which was still suspended was centrifuged out.

um corresponding to an absolute pressure of 12 mm. of mercury was then drawn, the mass was quickly heated to 125 degrees C. and then steam was passed therethrough in a manner as described in previous examples. The mass was heated to 135 degree C. and maintained at that temperature for an hour, the vacuum being adjusted to from 60 mm. to 70 mm. of mercury (absolute pressure) to prevent excessive foaming. The rapid cooling and steaming steps during such cooling were conducted as described in the above examples. The final reaction product possessed a light amber color and was substantially odorless.

The products described above can be reacted with various types of chemical compounds to produce novel products having great utility in various fields, particularly in conjunction with the preparation of emulsions of oleaginous and aqueous materials. Thus, it has been found that very valuable substances can be made by reacting the products, prepared as described above, with various kinds of acids or acid-reacting materials of inorganic or organic character. Among the acid and acid-reacting materials which may be employed are hydrochloric acid, sulphuric acid, phosphoric acid, boric acid, acid-reacting salts such as sodium acid sulphate, organic monocarboxylic, polycarboxylic, hydroxycarboxylic and otherwise substituted acids of aliphatic or aromatic character such as lactic acid, tartaric acid, oxalic acid, citric acid, malic acid, maleic acid, acetic acid, propionic acid, butyric acid, higher fatty and carboxylic acids, both saturated and unsaturated, including lauric acid, oleic acid, palmitic acid, linoleic acid, ricinoleic acid, stearic acid, hydroaromatic acids such as abietic acid, aromatic acids such as benzoic acid, naphthoic acid, and the like.

The proportions and nature of the acid utilized may vary and very novel and useful effects may be controllably obtained through the use of this mechanism, particularly with reference to the obtention of compounds which favor oil-in-water or water-in-oil emulsions. Thus, for example, if a water-soluble polycarboxylic acid, such as citric acid, is employed for reaction with the reaction products of the alkylolamines and higher carboxylic acid, and esters or anhydrides thereof, and the amount of such water-soluble polycarboxylic acid is such that substantially all of the acidic or carboxyl groups thereof are reacted with the basic nitrogen atom of said reaction products, the resulting complex is oil-soluble and tends to promote emulsions of the water-in-oil type. Again, if the higher fatty acids such as oleic acid and stearic acid are used instead of citric acid the lipophile properties of the final complex are increased and the tendency thereof is to favor emulsions of the water-in-oil type.

In the case of water-soluble polycarboxylic and hydroxycarboxylic acids such as citric acid, however, if a large excess of such acid is used for reaction with the alkylolamine reaction product, the ultimate complex becomes water-soluble and tends to promote emulsions of the oil-in-water type. This is evidently due to the fact that where a large excess of citric acid, for example, is present the free and unreacted carboxyl groups of the citric acid will appear to exert their hydrophillic characteristics thereby making the product more or less water-soluble with a concomitant effect upon the nature of their emulsion favoring tendencies. It will be seen, therefore, that we have evolved novel means to control the kind of emulsifying agent which is produced. This feature we regard as an important phase of the invention. This matter is fully disclosed in our copending application Serial No. 143,133 filed on even date herewith.

Valuable products can also be made by combining the reaction products, as described hereinabove in the examples, with certain acid-reacting oxygenated phosphorus, oxygenated sulphur, and oxygenated boron derivatives of polyhydroxy substances or of polyhydric alcohols. Particularly suitable, especially for use in white cosmetic preparations, is a product made by reacting 2 parts by weight of the product of Example III with 1 part by weight of monostearin pyrophosphate previously prepared by reacting 19 parts by weight of commercial monostearin with 4½ parts by weight of pyrophosphoric acid at 90 degrees C. Complex products of this type are fully described in our copending applications, Serial Nos. 143,134 and 143,136, filed on even date herewith.

Wherever the term "higher" is employed herein as applied to carboxylic acids or the like, it will be understood to mean at least six carbon atoms.

What we claim as new and desire to protect by Letters Patent of the United States is:

1. The process of preparing reaction products of alkylolamines and a member selected from the group consisting of higher carboxylic acids containing at least six carbon atoms, their esters, anhydrides, and mixtures thereof, having a light color and being substantially odorless which comprises conducting the reaction at elevated temperatures while passing steam through the reaction mass and, after the completion of the reaction, quickly reducing the temperature of the reaction mixture while maintaining a steam atmosphere at least until partial temperature reduction has been effected.

2. The process of preparing reaction products having a light color and being substantially odorless which comprises reacting a higher fatty acid ester of a polyhydroxy substance with an alkylolamine, the fatty acid radical of said ester containing at least six carbon atoms, at temperatures in excess of 100 degrees C. while passing steam through the reaction mass, and then quickly reducing the temperature of the resulting reaction mixture while maintaining a steam atmosphere at least until partial temperature reduction has been effected.

3. The process of claim 2 wherein the reaction is carried out at a reduced pressure.

4. The process of claim 2 wherein the ester comprises a member selected from the group consisting of triglyceride oils and fats, and the alkylolamine comprises triethanolamine.

5. The process of preparing reaction products having a light color and being substantially odorless which comprises reacting a member selected from the group consisting of triglyceride oils and fats with an alkylolamine at a temperature in excess of 200 degrees C. while passing steam through the reaction mass, and then quickly cooling the reaction mixture after substantial completion of the reaction while maintaining a steam atmosphere at least until partial temperature reduction has been effected.

6. The process of claim 5 wherein the alkylolamine comprises predominantly triethanolamine.

7. The process of preparing reaction products having a light color and being substantially odorless which comprises reacting a polyhydroxy substance which is at least partially esterified with higher fatty acids containing at least six carbon atoms, with an alkylolamine at a temperature in excess of 100 degrees C., continuously passing steam through the reaction mixture during said reaction and, after the reaction has been carried to the desired stage of completion, quickly cooling said reaction mixture while continuing the passage of steam therethrough.

8. The process of preparing reaction products having a light color and being substantially odorless which comprises reacting a member selected from the group consisting of triglyceride oils and fats with triethanolamine at a temperature in excess of 200 degrees C., continuously passing steam through the reaction mixture while maintaining it under a subatmospheric pressure and, after the reaction has been carried to the desired stage of completion, quickly cooling said reaction mixture to a temperature of the order of about 125 degrees C. while continuing the passage of steam therethrough.

9. The process of claim 7 wherein the ester is a member selected from the group consisting of higher fatty acid mono- and di-glycerides, the alkylolamine comprises triethanolamine, and the reaction temperature is of the order of about 135 degrees C.

10. The process of claim 5 wherein the reaction is carried out under sub-atmospheric pressures.

11. The process of claim 2 wherein the reaction is conducted at sub-atmospheric pressure.

12. The process of preparing reaction products having a light color and being substantially odorless which comprises reacting a member selected from the group consisting of triglyceride oils and fats, with an alkylolamine at elevated temperatures and at an absolute pressure of approximately 10 to 70 mm. of mercury while passing steam through the reaction mass, and then quickly cooling the reaction mixture after substantial completion of the reaction, the quick cooling being conducted while maintaining the reaction mixture in an atmosphere of steam.

13. The process of claim 12 wherein the alkylolamine comprises triethanolamine.

14. Reaction products having a light color and being characterized by substantial freedom from odor and resulting from the reaction of an alkylolamine and a higher fatty acid ester of a polyhydroxy substance, the fatty acid radical of which contains at least six carbon atoms, at temperatures in excess of 100 degrees C. while passing steam through the reaction mass, and then rapidly cooling the reaction mixture while maintaining a steam atmosphere at least until partial temperature reduction has been effected.

15. Reaction products in accordance with claim 14 wherein the alkylolamine comprises triethanolamine and wherein the reaction is carried out under sub-atmospheric pressure.

16. Reaction products having a light color and being characterized by substantial freedom from odor and resulting from the reaction of an alkylolamine and a member selected from the group consisting of higher carboxylic acids containing at least six carbon atoms, their esters, anhydrides, and mixtures thereof, at temperatures in excess of 100 degrees C. while passing steam through the reaction mass, and then rapidly cooling the reaction mixture while maintaining a steam atmosphere at least until partial temperature reduction has been effected.

17. Reaction products in accordance with claim 16 wherein the alkylolamine comprises triethanolamine.

18. Reaction products having a light color and being characterized by substantial freedom from odor and resulting from the reaction of a member selected from the group consisting of triglyceride oils and fats with triethanolamine at temperatures in excess of 200 degrees C. while passing steam through the reaction mass, and then rapidly cooling the reaction mixture while maintaining a steam atmosphere at least until partial temperature reduction has been effected.

19. Reaction products having a light color, substantial freedom from odor, and having the ability to promote emulsions of the oil-in-water type and comprising the reaction product of a water-soluble polycarboxylic acid and the product resulting from the inter-action of triethanolamine and a higher fatty acid ester of a polyhydroxy substance, the fatty acid radical of said ester containing at least six carbon atoms, at temperatures in excess of 100 degrees C. while passing steam through the reaction mass, and then rapidly cooling the reaction mixture while maintaining a steam atmosphere at least until partial temperature reduction has been effected.

20. Products in accordance with claim 19 wherein the higher fatty acid ester of a polyhydroxy substance comprises a member selected from the group consisting of higher fatty acid monoglycerides, diglycerides, triglycerides, and mixtures thereof.

MORRIS B. KATZMAN.
ALBERT K. EPSTEIN.